Figure 1A:
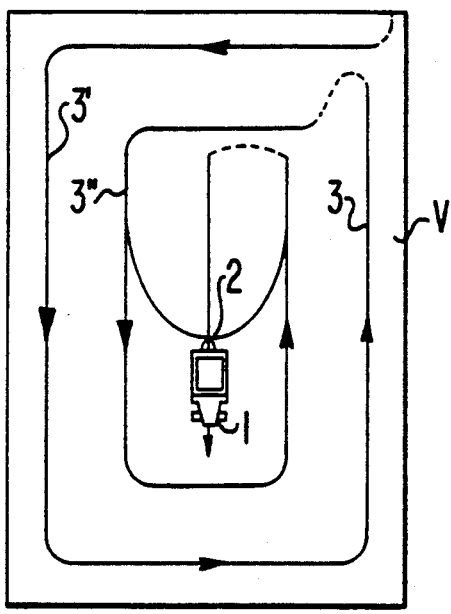
Figure 1B:
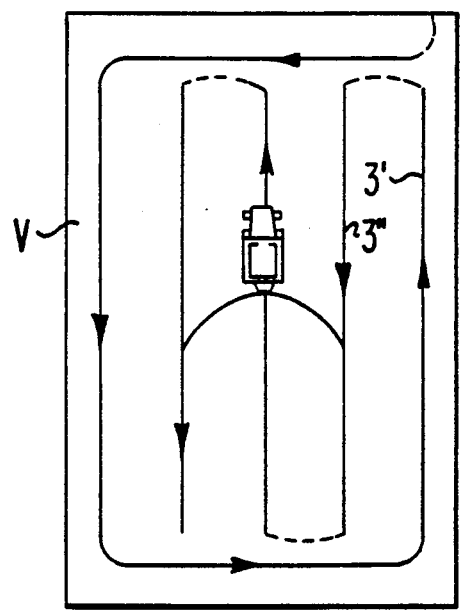
Figure 1C:
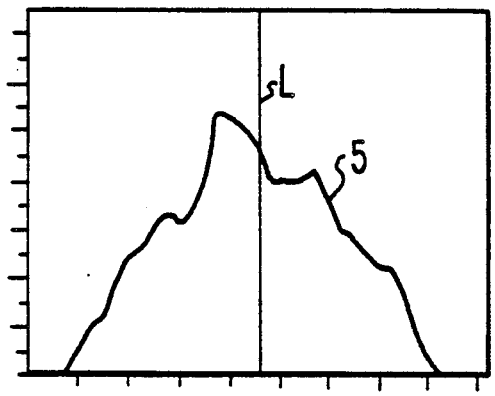
Figure 1D:
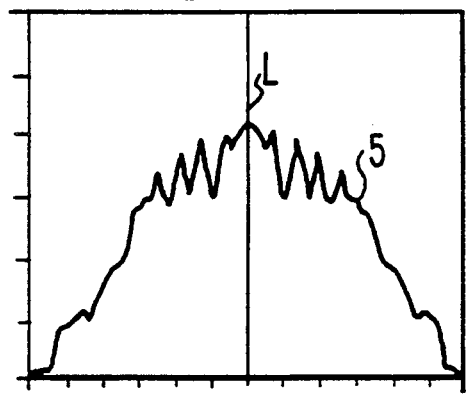
Figure 2:
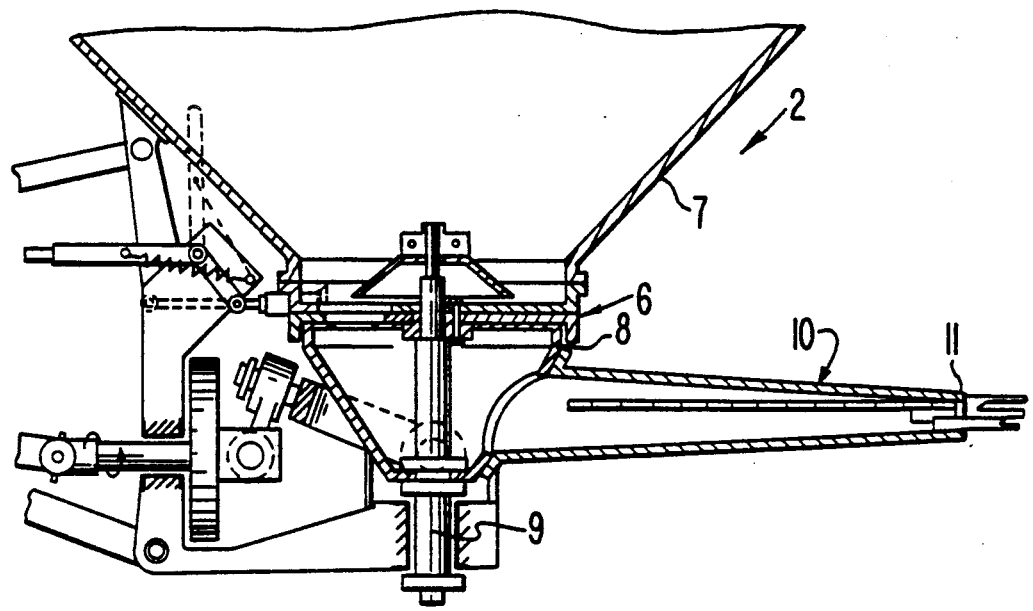
Figure 3:
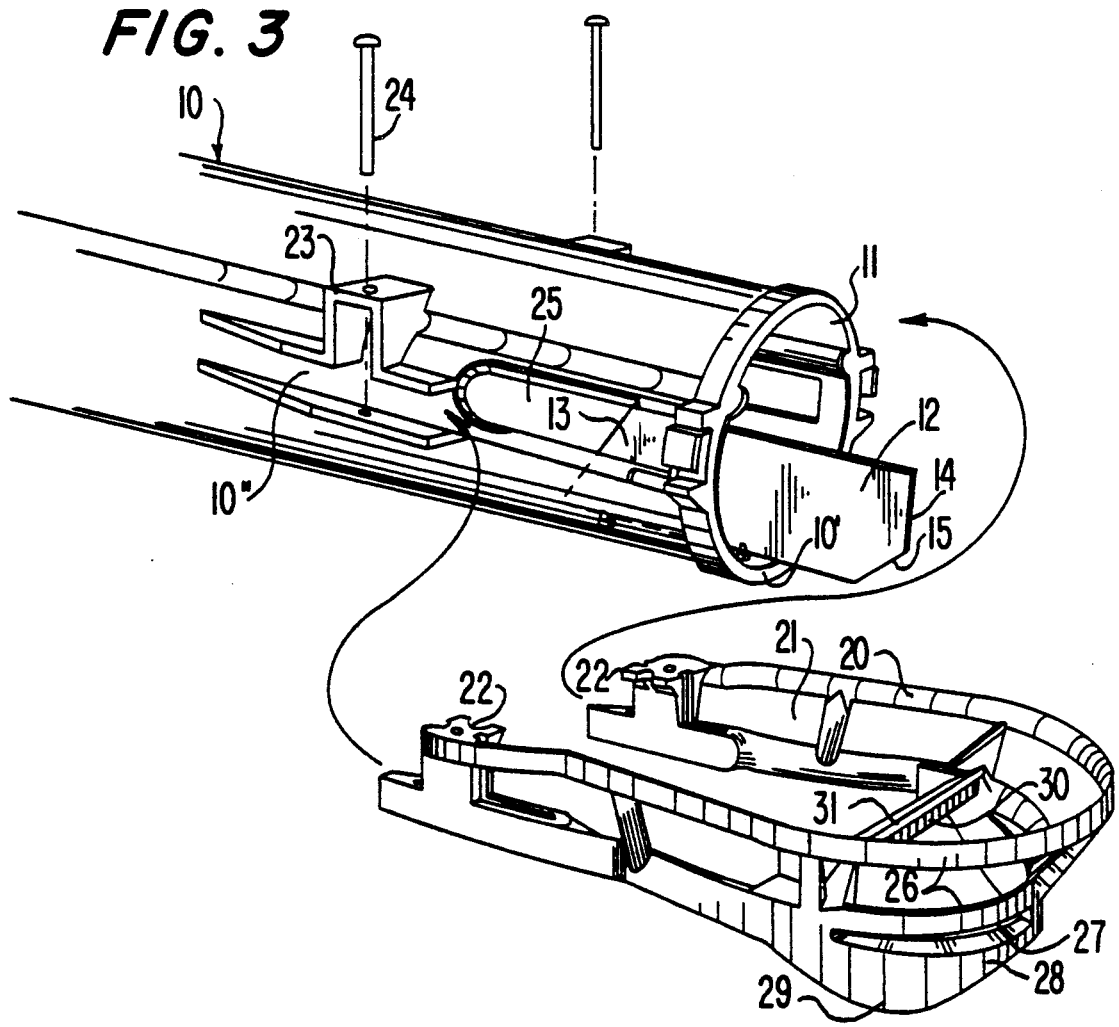

United States Patent [19]

Vissers

[11] Patent Number: 5,058,811

[45] Date of Patent: Oct. 22, 1991

[54] DEVICE FOR DISSEMINATION OF A SPREADABLE MATERIAL

[75] Inventor: Herbert J. Vissers, Hillegom, Netherlands

[73] Assignee: Multinorm B.V., Nieuw-Vennep, Netherlands

[21] Appl. No.: 416,222

[22] Filed: Oct. 2, 1989

[30] Foreign Application Priority Data

Oct. 3, 1988 [NL] Netherlands ............. 8802420

[51] Int. Cl.$^5$ ............................................. A01C 15/00
[52] U.S. Cl. ..................................... 239/659; 239/689
[58] Field of Search .............. 239/659, 652, 654, 670, 239/688, 689, 687, 661, 504, 518, 505, 590, 590.5, 524

[56] References Cited

U.S. PATENT DOCUMENTS

| | | | |
|---|---|---|---|
| 2,511,560 | 6/1950 | Bechmann | 239/652 |
| 3,942,726 | 3/1976 | Oosterling et al. | 239/689 |
| 3,966,124 | 6/1976 | Sukup | 239/687 |
| 4,598,868 | 7/1986 | Asaoka et al. | 239/659 |
| 4,793,558 | 12/1988 | Winkel | 239/689 |

FOREIGN PATENT DOCUMENTS

| | | | |
|---|---|---|---|
| 102580 | 9/1925 | Austria | 239/659 |
| 2250578 | 11/1974 | France | |
| 93254 | 1/1960 | Netherlands | |
| 7310755 | 2/1974 | Netherlands | |

*Primary Examiner*—Andres Kashnikow
*Assistant Examiner*—Michael J. Forman
*Attorney, Agent, or Firm*—Wegner, Cantor, Mueller & Player

[57] ABSTRACT

A device for the dissemination of a spreadable material, such as fertilizer in powder or granule form, which device consists substantially of a supported frame with storage holder 7 for the material for spreading, which holder 7 is provided with an outlet opening and a spreader pipe 10 driven for reciprocal swinging connected thereto, said spreader pipe 10 has near its free outflow opening means influencing the spread pattern, wherein a partition 12 is arranged extending in the central longitudinal plane of the pipe 10 and connecting to the bottom wall thereof and which protrudes freely from the pipe over a determined length, and to arrange above the transverse partition an extra rebound surface 31 which extends transversely of the lengthwise direction of the pipe behind the opening thereof, so being able to influence the spreading pattern such that the delivery onto the field is as even as possible.

6 Claims, 3 Drawing Sheets

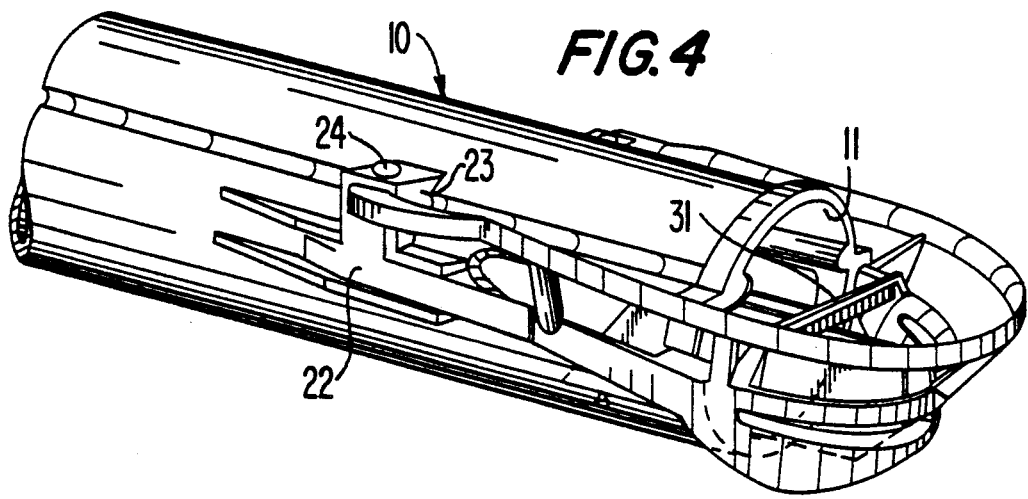
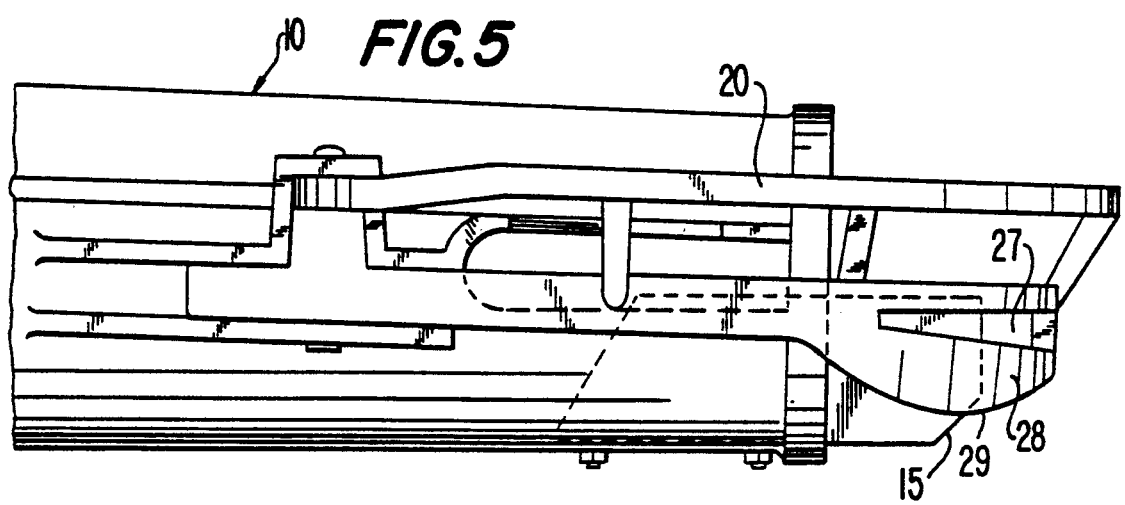
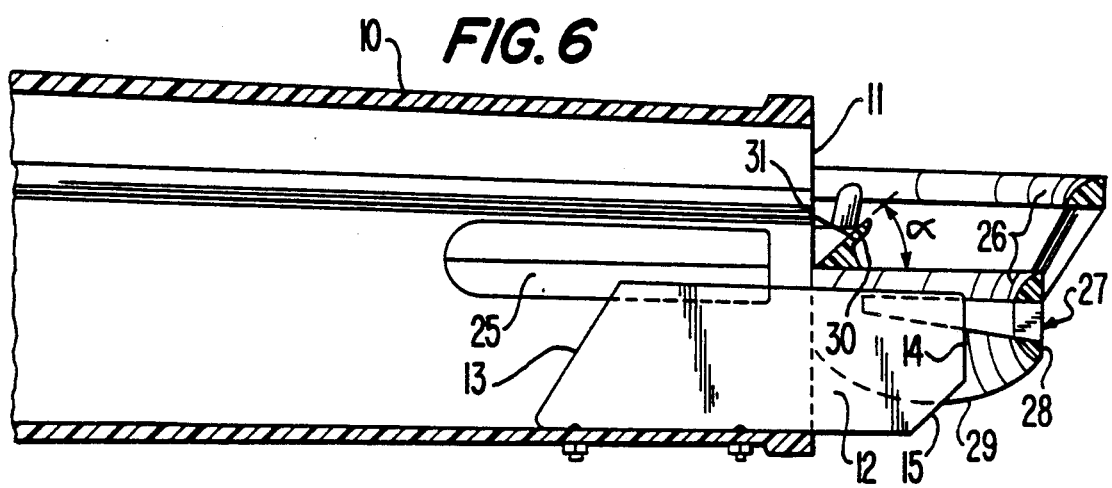

DEVICE FOR DISSEMINATION OF A SPREADABLE MATERIAL

The invention relates to a device for the dissemination of a spreadable material, such as fertilizer in powder or granule form, which device consists substantially of a supported frame with storage holder for the material for spreading, which holder is provided with an outlet opening and a spreader pipe driven for reciprocal swinging connected thereto, which spreader pipe has near its free outflow opening means influencing the spread pattern.

The problem which occurs in devices of the type described in the preamble is the uniformity of the delivery behind the vehicle, on which or to which the device is attached in order to be able to disseminate the material over the field. The so-called spreading pattern on either side of the central longitudinal plane of the vehicle travelling forward over the field should be specular but in practice this is for many reasons not the case. It is therefore essential to know precisely what the deviations are in order to choose a determined travel pattern over the field, in order to achieve a delivery over the field that is the most uniform possible in its entirety. One way to achieve this is by allowing the spreading paths to overlap each other and further by accurately performing the usual adjustments, that is, the width of spread, the spreading speed, dosage etc. The type of material for dissemination, granule of powder, likewise determines the spreading pattern as much as the weather influences. An important indicator in determining the deviation of an obtained spreading pattern is the so-called VC (variation coefficient). This is a measurement of the uniformity of the dissemination. It is desirable to obtain a variation coefficient which is lower than 15.

The invention has for its object to improve the construction of the means influencing the spreading pattern such that the delivery onto the field is as even as possible.

The device according to the invention is distinguished in that a partition is arranged extending in the central longitudinal plane of the pipe and connecting to the bottom wall thereof and which protrudes freely from the pipe over a determined length.

It has been shown empirically in tests that this central partition makes a positive contribution to obtaining a mirror-symmetrical spreading pattern in relation to the central longitudinal plane.

In has also been found effective to arrange above the transverse partition an extra rebound surface which extends transversely of the lengthwise direction of the pipe behind the opening thereof.

In a preferred embodiment this rebound surface is arranged on a bridge-like part situated on a bracket running around the outflow opening at a large distance, which bracket is fixed to the standing outside wall portions of the pipe, whereby the partition ends at a distance from the bracket.

Above mentioned and other features will be elucidated in the figure description of an embodiment following hereinafter.

In the drawing:

FIGS. 1A–D show schematic overviews of an asymmetrical and a symmetrical spreading patterns, and possible travel patterns over the field for spreading.

FIG. 2 shows an upright side view, partially in section, of an embodiment of the spreading device, with the spreader pipe and the improved means according to the invention for influencing the spreading pattern.

FIG. 3 shows a perspective top view of the outflow end of the spreader pipe with the unmounted means according to an embodiment for influencing the spreading pattern.

FIG. 4 shows a perspective view corresponding with FIG. 3, in this case however with mounted means for influencing the spreading pattern.

FIGS. 5 and 6 show respectively a side view and a standing lengthwise section of the spreader pipe end with the means for influencing the spreading pattern.

FIG. 1*a* and *b* show two different travel methods of an agricultural tractor 1 provided with a spreading device 2, which tractor can travel over the field V according to a path 3. In FIG. 1*a* this is a path around the field, whereby movement is in the same direction on each round, see 3', 3''. In contrast FIG. 1*b* shows a travel pattern to and fro in opposite directions, see the path 3' and 3''. The choice of whether to travel round or reciprocally over the field V is determined by the spreading pattern known to the user. This is shown in FIG. 1*c* and 1*d* respectively, whereby the central longitudinal plane is indicated by L and whereby the spreading pattern is indicated by the line 5. In FIG. 1*c* this is an asymmetrical spreading pattern. In FIG. 1*d* it is a symmetrical or specular spreading pattern. It will be apparent that an asymmetrical spreading pattern is suitable for the travel method according to FIG. 1 because each time the half with the high delivery goes together with the half with the low delivery, so that eventually a uniform spreading thickness is achieved over the field V. The spreading pattern according to FIG. 1*d* is suitable for a reciprocal movement travel method.

This is expressed in the so-called variation coefficient VC which amounts to 10 for the travel method 1*a* with the spreading pattern 1*c* for travel round the field, and to 15 for reciprocal travel. For the accurate specular spreading pattern according to FIG. 1*d* travel can be either reciprocal or round the field as no difference in the variation coefficient is achieved here.

The invention has for its object to approximate the spreading pattern according to FIG. 1*d*.

To this end the device according to FIG. 2 is embodied with a spreader pipe 10, which is fixed on a container 8 reciprocally driven around a standing shaft 9 and of which the upper side connects onto a storage holder 7. Arranged between the storage holder 7 and the container 8 are dosage means 6. The method of driving the container 8 is assumed to be known and falls further outside the scope of the invention. The drive is such that the spreader pipe 10 is moved reciprocally about a shaft 9 in a horizontal plane over a determined pre-adjustable angle. As a result of the reciprocal movement material is carried out of the storage holder 7 via the dosage means 6 into the container 8 and then via the spreader pipe 10 to the outflow end 11 thereof, after which the material is scattered freely over the field. In order to be able to alter the spreading pattern, means for determining the spreading pattern are arranged around or near to the outflow opening 11, which will be further elucidated hereafter.

In accordance with the invention one of the means for determining the spreading pattern is a partition 12 which connects to the bottom 10' of the spreader pipe 10. The height of the partition 12 is at least equal to half the height of the vertical diameter of the outflow opening 11. The partition 12 is formed at the front with a front edge 13 sloping from the bottom 10' to the outflow opening 11. The rear edge 14 of the partition 12 is set back at the bottom at 15 in the form of a chamfering but within the scope of the invention this can have any random form, for example stepped.

Arranged around the outflow opening 11 is a bracket 20 which is provided with passage openings 21. At the ends 22 the bracket is attached on each side to the standing side walls portions 10'' of the spreader pipe 10, for which purpose are arranged receiving elements 23 moulded onto the spreader pipe 10. Each of the end portions 22 can be fastened by means of the pins 24 into the receiving means 23 such that an easy replacement is ensured. In the standing wall portions between the outflow end 11 and the receiving means 23 an opening 25 is arranged in the spreader pipe 10 to obtain an extra outflow opening for the material for spreading, this outflow opening 25 co-acting with the passage openings 21 in the bracket 20. It is noted that the upper edge of the bracket 20 displays a convex inner surface 26, which also applies to the lower edge thereof. In addition another extra passage opening 27 is formed at the lower edge 26, the function of which corresponds with that of the openings 21 in the top part of the bracket 20. It is noted that the portion 28 of the bracket 20 has a bottom edge 29, which is curved downward on either side of the central longitudinal plane of the spreader pipe that runs through the partition 12, so that the portion 28 broadens in vertical sense on either side of that longitudinal plane.

Finally, a bridge-like part 30 is arranged between the bracket edge strips which is provided with a rebound surface 31 that encloses an acute angle α with the longitudinal direction of the spreader pipe, see FIG. 6. This bridge piece 30 extends above the partition 12 and transversely over the outflow opening 11.

The bridge piece 30 can lie free in relation to the partition 12 or be fixed thereto, in accordance with the desired construction. The rear edge 14 of the partition lies at a large distance from the lower edge of the bracket 20, see FIG. 6.

The dissemination of the material thrown out by the pipe 10 will, as will be apparent from the above description, be influenced by the number of outflow openings of the spreader pipe 10, that is, 11, 25 and by the subsequent passage openings 21, 27 of the bracket 20 situated at an interval therefrom, whereby a portion touches the rebound surface 31 and whereby the distribution over the sides on either side of the central longitudinal plane is improved by the lengthwise partition 12 on the bottom of the spreader pipe 10.

The invention is not limited to the above described embodiment of spreader bracket and lengthwise partition.

I claim:

1. A device for the dissemination of spreadable material, such as fertilizer in powder of granule form, comprising:
   a supported frame with a storage holder for the material for spreading with an outlet opening disposed therein;
   a spreader pipe connected at a proximal end to said holder which pipe cooperates with said outlet opening, said spreader pipe being driven for reciprocal substantially horizontal swinging, and said pipe comprises top, bottom and side walls and an outflow opening at a distal end of said pipe with a given diameter and;
   a spread pattern influencing means disposed at said distal end of said pipe comprising, a partition connected to the bottom wall of said pipe and extending vertically upwardly therefrom and which protrudes down stream from the outflow opening of said pipe over a determined length, said partition comprising top, front, rear and bottom edges, characterized in that said front edge is upstream from the rear edge, and said front edge is downstream from said proximal end and;
   a bracket disposed at the distal end of said spreader pipe, said bracket having ends fixed to said side walls of said pipe, said bracket extending laterally from side wall to side wall at a distance downstream from said outflow opening and said partition, which bracket comprises upper and lower edges displaced at a distance from each other to form passage openings and;
   a rebound surface disposed in said bracket downstream from the outflow opening of said pipe and extending transversely of and above said partition at an incline to a longitudinal axis of said spreader pipe for directing at least a portion of the spreadable material in a upward direction.

2. The device as claimed in claim 1 wherein a lower portion of said rear edge is inclined toward said bottom edge.

3. The device as claimed in claim 1 wherein said rebound surface is a part of a bridge piece which extends between said ends of said bracket downstream from said outflow opening of said spreader pipe.

4. The device as claimed in claim 1 wherein said partition extends vertically from the bottom wall of said spreader pipe a distance of at most half of said diameter thereof.

5. The device as claimed in claim 1 wherein said front edge of said partition slopes diagonally from said bottom wall toward said outflow opening.

6. The device as claimed in claim 1 wherein said lower edge of said bracket is a surface curving downward on either side of said partition.

* * * * *